April 14, 1964  B. W. YOUNG  3,128,997

APPARATUS FOR FORMING AND APPLYING MIXTURES

Filed Jan. 9, 1961

INVENTOR.
BERNARD W. YOUNG

BY Baldwin & Wight
his ATTORNEYS

United States Patent Office 3,128,997
Patented Apr. 14, 1964

3,128,997
APPARATUS FOR FORMING AND APPLYING
MIXTURES
Bernard W. Young, P.O. Box 2369, Waco, Tex.
Filed Jan. 9, 1961, Ser. No. 81,441
17 Claims. (Cl. 259—161)

This invention relates to apparatus for forming and applying mixtures, more particularly slurry mixtures such as slurry seals comprising particulate solid aggregate material, emulsified asphalt and usually moisture, which may be water added to the aggregate.

Emulsified asphalt slurry seals have been used primarily for surfacing or resurfacing and sealing vehicular transportation surfaces generally, for example streets and roads. Slurry seals of this class should have such a composition and should be so handled, that is, mixed and deposited upon the surface, as to have a high degree of impregnation so as to produce an effective surface seal, fill cracks and so on with little or minimum tendency to separate from the base surface.

Emulsified asphalt slurry seals have been used in the past with varying degrees of success when mixed in and deposited on the surface to be coated and sealed by mixing apparatus of conventional kinds, primarily ordinary ready mixed concrete trucks of well known design and mixing characteristics. Among the problems heretofore encountered has been that of effecting a satisfactory mixing without suffering the disadvantage of requiring more than desirable time for the slurry seal to set after being deposited on the surface, that is to be ready to accommodate vehicles. It has been known previously that the presence of certain materials, principally calcium oxide, in any of the mineral aggregates used in such slurries causes a chemical "break" when mixed with the emulsified asphalt, the break being accompanied or manifested by setting or the losing of flowable and spreadable characteristics of the mixture. In order to prevent the occurrence of a break in the mixture while still being mixed in a relatively slowly operating mixing apparatus, and so to insure that the mixture could be deposited onto the surface before the break or setting, it has been necessary or usual to include a relatively high water content in the mixture. It has followed that with high water contents, a slurry once deposited upon the surface has had to undergo a so called "evaporation break" of long duration before the sealed surface could accommodate traffic. Efforts to shorten the evaporation break time by reducing the water content have inevitably brought on complications in the premature occurrence of a chemical break in the mixer. The dilemma of liability of premature chemical break in the mixer on the one hand and undesirably long evaporation break on the other hand is apparent.

An object of the present invention is to overcome the obstacles to facile and economical use of slurry seals. More particularly, it is an object of the invention to provide a mixing apparatus for producing slurry seals by mixing the ingredients in such a way as to take advantage of the benefits of a mixture inherently having a quick chemical break tendency without permitting the chemical break to take place until the mixture has been deposited upon the surface to be treated.

The present applicant has believed for some time that it would be most desirable to use a slurry seal mixture inherently having quick chemical break characteristics, to mix the ingredients thoroughly and quickly enough to enable the mixture to be discharged onto the road or other surface before the break takes place and then to have the slurry set and become ready for use in a short time through a quick chemical break taking place in the material deposited on the surface. The present invention provides apparatus to achieve this goal.

As stated above, the slurry seal mixture should be such as to impregnate the old surface to be treated to a maximum extent so as to provide an effective seal and to avoid separation or parting. The apportioning of the ingredients of a mixture having the desired impregnation properties is well within the skill of asphalt chemists and engineers. Generally stated, some solid material aggregates are not suitable for use as the sole solid material in slurry seal mixtures compounded and mixed in accordance with this invention, because they will not produce a chemical break when mixed with emulsified asphalt. One example of such a material is beach sand which does not produce a chemical break when mixed with asphalt emulsion, and therefore cannot be used as the only solid material in practicing the invention. However, beach sand and other materials known to have no chemical break inducing characteristics when mixed with emulsified asphalt may be used together with other materials which do have the required tendency for controlling the mixing characteristics and the wearing properties of the slurry seal mixture. The prime considerations in practicing the invention are firstly that the mixture itself, as to constituency, be inherently capable of producing a quick chemical break, and secondly, thorough mixing of the ingredients and discharging them from the mixing apparatus in a very short time so that the ensuing chemical break will take place after the slurry has been deposited upon the surface. The first requirement is determinable on the basis of constituent properties known as asphalt chemists and engineers, but heretofore they did not provide a method or apparatus by the use of which the advantages of the quick chemical break could be realized in practical applications of slurry seals. A typical example of a slurry seal mixture produced by continuously feeding materials to and discharging the mixture from a mixing apparatus follows:

Amount of emulsion per minute—16 gallons
Amount of aggregate per minute—800 lbs.
Amount of water per minute—2 to 16 gallons The ratio of emulsion to aggregate is, of course, variable, according to the desired mixing characteristics and final properties of the slurry seal. The amount of water is variable according to the desired thickness of the slurry which may depend upon the nature of the old surface to be treated or sealed. Furthermore, the amount of water may be varied according to any moisture content inherently present in the solid aggregate. In the foregoing example, the emulsified asphalt conformed to Texas specification E.A.–11–M (Asphalt Institute specification SS 1). Emulsified asphalt conforming to Texas specification E.E.–10–S has also been used with good results.

In the above example, thet aggregate was Rockdale Slag, the aggregate conforming to the following specifications:

PHYSICAL ANALYSIS OF ROCKDALE SLAG
AGGREGATE

Sieve Analysis (Wet)

| Sieve size: | Percent passing |
|---|---|
| #4 | 97 |
| #8 | 82 |
| #16 | 43 |
| #30 | 22 |
| #50 | 16 |
| #100 | 8.9 |
| #200 | 4.0 |
| #325 | 2.2 |

Unit weight (dry loose)_____lb./c.f.__ 92
Specific gravity_____ 2.81

The analysis of the Rockdale aggregate is indicated by the following analysis and properties of Rockdale fly ash:

TYPICAL CHEMICAL ANALYSIS

Silicon dioxide ($SiO_2$) _____ 38.6%.
Calcium oxide (CaO) _____ 20.9%.
Ferric oxide ($Fe_2O_3$) _____ 6.17%.
Aluminum oxide ($Al_2O_3$) _____ 18.7%.
Magnesium oxide (MgO) _____ 1.05%.
Free lime (CaO) _____ None detectible.
Available alkalies ($Na_2O + K_2O$) _____ 1.06%.
Loss on ignition_____ 6.00%.
Moisture content_____ 0.79%.

TYPICAL PHYSICAL PROPERTIES

Specific surface area (Blaine)—2115 sq. cm./gm.
Sieve analysis (wet).

| Sieve Size | Percent Passing | Percent Retained |
|---|---|---|
| #50 | 97 | 3 |
| #100 | 88 | 12 |
| #200 | 70 | 30 |
| #325 | 63 | 37 |

Unit weight (dry loose)_____lb./c.f.____ 76
Specific gravity_____2.57

As previously stated, sand and other mineral fillers can be used if properly graded and if free of undesired chemical reaction tendencies toward the other ingredients of the mixture.

In the mixing of a slurry seal according to the foregoing example, and other slurry seals having the desired quick chemical break tendencies, the aggregate is introduced into a mixing container and is fed through the container while being agitated and thereby mixed in such a way as to effect thorough and intimate mixing of the constituents in a very short period of time, which may be as short as of the order of 1½–2 minutes. It thus is possible to discharge the slurry seal mixture onto the surface to be treated before there has been any substantial chemical break within the mixing apparatus, or a mechanical break which would occur as a result of a long mixing operation, yet while the mixture is so nearly at the chemical breaking point that the chemical break will take place very soon after the material has been spread on the surface. All of this is accomplished with the use of much less moisture in the mix than heretofore was considered possible with the distinctly advantageous result that the slurry seal mixture, once applied to the surface does not have to go through a time consuming evaporation break before it is ready to bear traffic.

Salient aspects of the mixing procedure include the application of force to the mixture tending to move it through the mixing container continuously to the point of discharge from the container, and the application of other forces tending to move the mixture oppositely, one of the forces bucking the other of the forces, so to speak, and producing the required intimate mixture within a very short time.

One form of mixing apparatus which has been used with marked success in practicing the invention in applying slurry seal to thousands of square yards of road and the like surfaces, including air strips, is shown in the accompanying drawings, in which.

An illustrative embodiment of a mixer M embodying the invention in a preferred form is shown in its most usual but not necessarily its only environment of use as being mounted upon a wheeled truck only a part of the frame of which is shown at T. Also mounted on the truck is a slurry spreader S disposed to spread and otherwise apply slurry discharged by the mixer to the surface to be coated or sealed. A belt conveyor C is mounted under a hopper H carried by the truck for receiving aggregate, that is particulate solid material, and delivering it into a horizontal mixer container MC, the aggregate falling off the conveyor into the front part of the mixer container shown at the left in FIGURE 1. A water inlet means, e.g. a fitting WI, preferably a spray head or nozzle, is arranged to discharge into the container MC adjacent to the point of delivery of aggregate to the container, and an emulsion inlet means, e.g. a fitting EI, preferably also a spray head or nozzle, is arranged to deliver emulsified asphalt to the container MC at a point spaced from the water inlet WI in the direction of travel of material from the front to rear of the container, that is from left to right as viewed in FIGURE 1. A discharge gate generally designated G, is provided in the rear of the container for delivering mixed slurry to the roadway or other surface to be spread and finished off by the spreader S. The latter may be of the sled type equipped with a distributing belt and squeegee of generally known construction.

Figure 5:
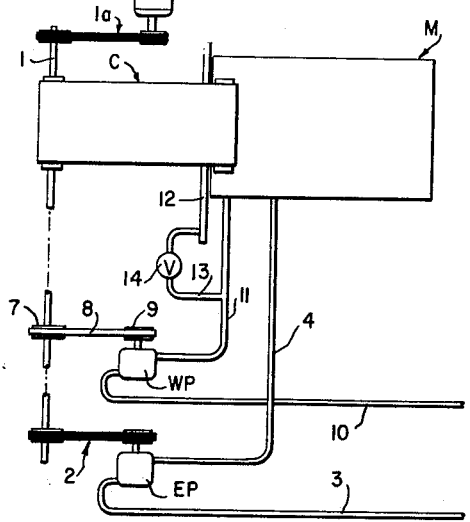
FIGURE 5 is a schematic view or flow diagram showing the relation of the aggregate conveyor, and the emulsion and water supplies to the mixer.

Predeterminedly proportioned amounts of aggregate, water and emulsified asphalt are delivered to the front part of the mixer container MC. The proportions may be varied according to conditions, such as weather and the specific type of surfacing required. However, for any particular sealing application, the proportions, once determined, should be maintained constant or substantially so. FIGURE 5 shows schematically an arrangement by means of which the proportions, once determined, and the mechanism adjusted accordingly, will maintain the proportions constant for all practical purposes. As shown in FIGURE 5, an internal combustion engine ICE serves as a common source of power or driver for the aggregate conveyor C, an emulsion pump EP and a water pump WP. Drive from the internal combustion engine ICE is transmitted to a shaft 1 through a chain and sprocket drive 1a. The shaft 1 drives the conveyor C and also transmits drive to the emulsion pump EP by a chain and sprocket drive 2. The pump EP receives its supply of emulsified asphalt through a pipeline 3 and delivers the emulsion to the emulsion inlet spray head EI by way of a pipe 4. Thus, for any predetermined opening of a hopper gate 5 controlling the rate of feed of aggregate to the conveyor C, the proportions of emulsion and aggregate delivered to the mixer container MC will remain constant by virtue of the fixed drive ratio of the conveyor and the pump EP. Preferably, the engine ICE is governed to operate at a constant speed, or substantially so. When it is desired to vary the proportions of aggregate and emulsion, the hopper gate 5 may be adjusted so as to increase or decrease the rate of feeding of aggregate to the mixer container, the rate of delivering emulsion, however, remaining unchanged.

As previously indicated, the amount of any water added to the mixture will depend upon practical considerations, including importantly the degree of dampness of the aggregate itself, weather conditions and the viscosity of the slurry desired, according to the nature and condition of the surface to be treated. The water pump WP is driven from the shaft 1 through a pulley 7, V belt 8 and variable diameter pulley 9 on the water pump shaft. By adjusting the effective diameter of the pulley 9, required variations in the rate of delivering water to the mixer container may be obtained. As shown in FIGURE 5, water is supplied through a pipe 10 to the pump WP and is discharged by the pump through a pipe 11 into the mixer container.

In many cases, it may be advisable to wet the roadway or other surface with water in advance of depositing the slurry seal mixture on the surface. For this purpose, a spray bar 12 is mounted on the truck equipment, for example at the front of the mixer container MC as shown in FIGURE 1, and is arranged to be supplied with water through a branch pipe 13 extending from the pipe 11 and being controlled by a valve 14.

In the operation of the mixing apparatus, considered generally, aggregate is introduced into a material receiving station RS at the front or left end of the container MC, as is water through the spray head WI, and the aggregate and water are then given a preliminary agitation and mixing in the front portion of the container MC by a mixer structure generally designated MS. The mixed aggregate and water are fed toward a discharging station DS at the rear of the container MC, emulsified asphalt being introduced through the spray head EI at a point which, in the form shown, is approximately one third of the length of the container MC from front to rear, or left to right as viewed in FIGURE 1. The slurry, thoroughly mixed, is discharged at the rear through the gate G. Importantly, the emulsified asphalt does not come into contact with the aggregate until the latter has been thoroughly moistened, as by water introduced at the spray head WI and mixed with the aggregate before the latter has moved rearwardly to the emulsion inlet EI. During the travel of the ingredients and the mixture of ingredients toward the gate G, they are subjected to different forces, some tending to feed the material rearwardly as well as to agitate it, and others tending to feed the material forwardly, the bucking of the forces creating an intense and thorough agitation which produces a completely mixed slurry seal within such a short time that the finished mixture may be delivered from the gate G before any break has taken place within the mixer.

Figure 2:
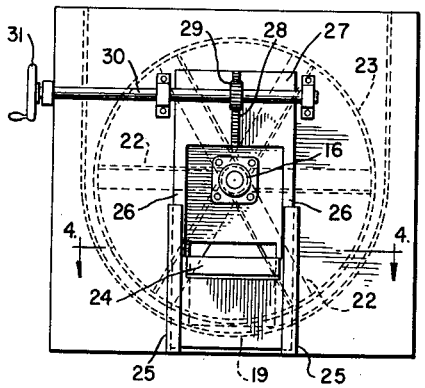
FIGURE 2 is a rear elevational view of the discharge end of the mixing apparatus.

This method of mixing, and its advantages are realized by virtue of a unique construction of the mixer M, and particularly the mixer structure or means MS. In the illustrated embodiment, the mixer structure MS comprises a horizontal central shaft 15 mounted to rotate in bearings 16, 16 carried respectively by the front and rear end walls 17 and 18 of the container MC. The container MC has a substantially semicylindrical bottom portion 19 which merges with vertically extending sides as shown in FIGURE 2. The axis of the shaft 15 extends from the receiving station RS to the discharging station DS, and is approximately at the top of the semicylindrical bottom portion 19.

Figure 1:
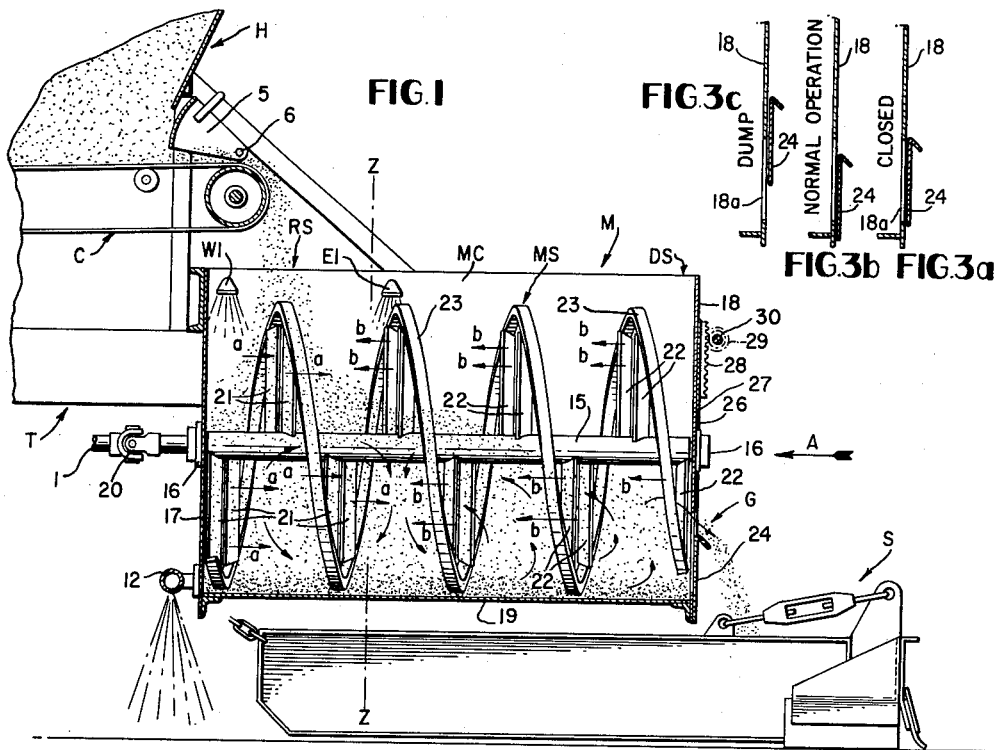
FIGURE 1 is a vertical longitudinal sectional view of a mixing apparatus embodying the invention with certain parts shown in elevation, a slurry spreading apparatus and hopper and conveyor for delivering aggregate to the mixer being shown in association with the mixer.

The mixer structure MS is preferably driven from the shaft 1 through a universal coupling 20 connected to the shaft 15, the shaft being rotated clockwise as viewed from the rear of the container MC, that is when viewed when looking in the direction of the arrow A in FIGURE 1.

The structure MS includes means, as shown a plurality of blades or paddles 21 and 22, mounted on and projecting radially from the shaft 15 and being deployed helically along the shaft axis. The outer ends of the blades or paddles serve to mount a ribbon like helical means which, in the illustrative structure, is a member 23 which follows the helical deployment of the blades or paddles. The helix 23 is of a radius such as to enable the helix to operate close to the bottom 19 of the mixer container with, of course, reasonable and safe operating clearance. When the helix is rotated clockwise as viewed from the rear, it will act continuously from end to end with a tendency to force material toward the gate G in the container rear wall.

As stated above, the material is subjected to the actions of opposing forces within the container for effecting intimate mixing within a short period of time. To this end, the first set of blades 21, which extend from the front wall 17 of the container through a first zone terminating at the line Z—Z in FIGURE 1, are inclined about their own radial axes with respect to their planes of rotation, the inclination of the blades 21 being such that their rotation tends to force material in the receiving station RS toward the right, that is toward the discharge gate G, in concert with the action of the helix 23. Thus, the blades 21 and helix 23 act as material mixing and feeding means. The direction of forcing of material by the first set of blades 21 is indicated by arrows *a* applied to these blades in FIGURE 1. The water introduced in the receiving station RS through the inlet WI is relatively very readily mixable with the aggregate, so that although the blades 21 and helix 23 both act in the same direction in the receiving station, the aggregate will be thoroughly and evenly moistened by the time it has moved rearwardly to the zone Z—Z.

The blades of the second set of blades 22 are, however, inclined oppositely to the blades 21. Consequently, these blades which are in a second zone extending from the line Z—Z to the rear wall 18, tend to force material forwardly, as indicated by the arrows *b*, in opposition to the forcing of material by the helix 23 and blades 21 acting in concert. Thus, the blades 22 act as material mixing and feed opposing means. The result of the oppositely acting forces is to prevent straight-through flow of the mixture from front to rear, and to cause the mixture to be circulated in various directions as indicated by the curved arrows in FIGURE 1, and to be humped up within the container, so to speak, as shown by the stippling. By preventing straight-through flow of material, stratification and poor mixing are avoided, and very importantly, the time required for producing a satisfactory mixture is greatly reduced. Since the emulsion is introduced at the spray head EI to the rear of the zone Z—Z, it will come into contact with the aggregate only after the latter has been thoroughly moistened, and premature breaking of the emulsion will be prevented.

Still further improvements are effected by discharging the slurry mixture from the container MC at a level approximately that of the top of the material in the container, and well above the container bottom 19. High level discharging of the mixture avoids initial and continued or sporadic draining of an "off" mixture too high in liquid, especially when the container is tilted with its discharge end lowered, as when the equipment is ascending a hill.

Figures 3A, 3B, 3C:
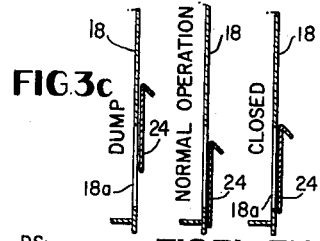
FIGURES 3a, 3b and 3c are views in vertical section, showing three positions of a discharge closure member or gate respectively when closed, when set for normal slurry discharging operation, and when set for emptying the mixing apparatus container.
Figure 4:
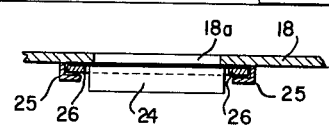
FIGURE 4 is a transverse horizontal sectional view on line 4—4 of FIGURE 2, showing the mounting of the closure member or gate on the rear wall of the mixing container.

In the illustrated construction, high level mixture discharge is achieved by provision of an opening 18*a* in the container rear wall 18, and a closure member or movable gate component 24 so mounted on the container as to be moved downwardly to the position shown in FIGURES 1 and 3*b* to enable the mixture to be discharged over the top of the closure member 24 at a level well above that of the container bottom and below the top of the opening 18*a*. The closure member is of plate-like form, and is mounted to slide vertically in guide tracks 25 secured to the container rear wall 18. The member 24 is provided with upwardly extending arms 26 bridged by a plate 27 which is equipped with a rack 28 meshing with a pinion 29 on a shaft 30 equipped with a hand wheel 31. Operation of the wheel 31 and its associated driving elements will raise or lower the gate member 24 as required. FIGURE 3*a* shows the gate in closed position, completely covering the opening 18*a*, FIGURES 1 and 3*b* show the gate in a normal operating position for discharging mixed slurry over the top of the gate at a high level with reference to the container bottom. The rate of discharge of the material may be varied according to requirements by adjusting the gate means to define selected different degrees of effective opening above the gate 24. The gate may be raised to the relatively extreme position shown in FIGURE 3c to enable the mixer container MC to be cleaned out by a stream of flushing water, in this case the opening 18a being uncovered at or immediately above the container bottom to provide a container emptying opening.

The foregoing description of the method of producing slurry seal mixtures and apparatus for use in practicing the method is believed to be so full and complete as to enable those skilled in the art to practice the invention. It may, however, be noted with more particularity that the mixing apparatus illustrated and described, and which has been used with marked success, is four feet long, the helix diameter is twenty-eight inches, the blades 21—22 are spaced from each other at 60° around the shaft, the helix pitch is eleven and one-half inches, and the preferred operating speed of the mixer structure MS is 60–80 r.p.m. It is, of course, apparent that changes may be made in particular dimensions, proportions and speeds and otherwise according to the materials used, the weather and the condition of the surface to be sealed. Use of the opposing forces and the top discharge is preferred to be maintained in any modified method or structure.

The procedure and structure described and shown are representative of the invention, but it is intended that the disclosure be illustrative rather than definitive, the invention being defined in the claims.

I claim:

1. In a mixing apparatus, a container having a material receiving station and a mixture discharging station; and a mixer structure mounted for rotation in said container about an axis extending from said receiving station to said discharging station and comprising first means extending substantially from said receiving station to said discharging station and being operable during rotation of said mixer structure for applying force to the material tending to move the material toward said discharging station, second means extending substantially from said receiving station toward said discharging station and terminating at a part of said container intermediate said stations and also being operable during rotation of said mixer structure for applying force to the material tending to move the material from said receiving station toward said discharging station in concert with said first means, and third means extending from said intermediate part of said container to said discharging station and being operable during rotation of said structure for applying force to said material tending to move the material toward said receiving station in opposition to the forcing of said material by said first and second means.

2. In a mixing apparatus, a container having a material receiving station and a mixture discharging station; and a mixer structure mounted for rotation in said container about an axis extending from said receiving station to said discharging station and comprising helical means extending substantially from said receiving station to said discharging station and being operable during rotation of said mixer structure for applying force to the material tending to move the material toward said discharging station, first paddle means extending substantially from said receiving station toward said discharging station and terminating at a part of said container intermediate said stations and also being operable during rotation of said mixer structure for applying force to the material tending to move the material from said receiving station toward said discharging station in concert with said helical means, and second paddle means extending from said intermediate part of said container to said discharging station and being operable during rotation of said structure for applying force to said material tending to move the material toward said receiving station in opposition to the forcing of said material by said helical and first paddle means.

3. In a mixing apparatus, a container having a substantially semi-cylindrical bottom, a material receiving station and a mixture discharging station; and a mixer structure mounted for rotation in said container about an axis extending from said receiving station to said discharging station and comprising a helix extending close to said container bottom substantially from said receiving station to said discharging station and being operable during rotation of said mixer structure for applying force to the material tending to move the material toward said discharging station, a plurality of paddles deployed about the axis of said helix substantially from said receiving station toward said discharging station and terminating at a part of said container intermediate said stations and being inclined in one direction and thereby being operable during rotation of said mixer structure for applying force to the material tending to move the material from said receiving station toward said discharging station in concert with said helix, and other paddles deployed about the axis of said helix from said intermediate part of said container to said discharging station and being inclined oppositely to the inclination of said first named paddles and thereby being operable during rotation of said structure for applying force to said material tending to move the material toward said receiving station in opposition to the forcing of said material by said helix and said first named paddles.

4. In a mixing apparatus, a container having a material receiving station and a mixture discharging station; and a mixer structure mounted for rotation in said container about an axis extending from said receiving station to said discharging station and comprising a central shaft, material mixing and feeding means mounted on said shaft and including a first set of blades within a first zone adjacent said receiving station and terminating at a part of said shaft intermediate said receiving station and said discharging station, the blades of said first set respectively being inclined about their own axes at an angle with reference to their planes of rotation whereby to tend to force material toward said discharging station, and material mixing and feed opposing means including a second set of blades within a second zone extending from said intermediate part of said shaft to said discharging station and being inclined about their own axes oppositely to the inclination of said first set whereby to tend to force material toward said receiving station in opposition to the forcing of material by said material mixing and feeding means, the latter exerting a greater force on the material than said material mixing and feed opposing means whereby said material will be fed from said receiving station to said discharging station.

5. In a mixing apparatus, a container having a material receiving station and a mixture discharging station; and a mixer structure mounted for rotation in said container about an axis extending from said receiving station to said discharging station and comprising a central shaft, a plurality of blades mounted on and extending outwardly from said shaft in helical deployment therealong, a first set of said blades being within a first zone adjacent said receiving station and terminating at a part of said shaft intermediate said receiving station and said discharging station, the blades of said first set respectively being inclined about their own axes at an angle with reference to their planes of rotation whereby to tend to force material toward said discharging station, a second set of said blades being within a second zone extending from said intermediate part of said shaft to said discharging station and being inclined about their own axes oppositely to the inclination of said first set whereby to tend to force material toward said receiving station in opposition to the forcing of material by the blades of said first set, and a helix surrounding said shaft, following the helical deployment of said blades and being mounted on the outer ends of said blades, said helix acting in concert with said first set of blades for forcing material from said receiving station toward said discharging station in opposition to the forcing of material toward said receiving station by said second set of blades.

6. In an apparatus for mixing two different liquids with particulate solid material, a container having a solid material receiving station and a mixture discharging station; means for introducing solid material to said container at said receiving station; a mixer structure mounted for rotation in said container about an axis extending from said receiving station to said discharging station and comprising first means extending substantially from said receiving station to said discharging station and being operable during rotation of said mixer structure for applying force to the material tending to move the material toward said discharging station, second means extending substantially from said receiving station toward said discharging station and terminating at a part of said container intermediate said stations and also being operable during rotation of said mixer structure for applying force to the material tending to move the material from said receiving station toward said discharging station in concert with said first means, and third means extending from said intermediate part of said container to said discharging station and being operable during rotation of said structure for applying force to said material tending to move the material toward said receiving station in opposition to the forcing of said material by said first and second means; means for introducing one of said liquids to said container adjacent said receiving station; and means for introducing the other of said liquids to said container substantially at said intermediate part of said container.

7. In an apparatus for mixing two different liquids with particulate solid material, a container having a solid material receiving station and a mixture discharging station; means for introducing solid material to said container at said receiving station; a mixer structure mounted for rotation in said container about an axis extending from said receiving station to said discharging station and comprising helical means extending substantially from said receiving station to said discharging station and being operable during rotation of said mixer structure for applying force to the material tending to move the material toward said discharging station, first paddle means extending substantially from said receiving station toward said discharging station and terminating at a part of said container intermediate said stations and also being operable during rotation of said mixer structure for applying force to the material tending to move the material from said receiving station toward said discharging station in concert with said helical means, and second paddle means extending from said intermediate part of said container to said discharging station and being operable during rotation of said structure for applying force to said material tending to move the material toward said receiving station in opposition to the forcing of said material by said helical and first paddle means; means for introducing one of said liquids to said container adjacent said receiving station; and means for introducing the other of said liquids to said container substantially at said intermediate part of said container.

8. In an apparatus for mixing two different liquids with particulate solid material, a container having a solid material receiving station and a mixture discharging station; means for introducing solid material to said container at said receiving station; a mixer structure mounted for rotation in said container about an axis extending from said receiving station to said discharging station and comprising a helix extending close to said container bottom substantially from said receiving station to said discharging station and being operable during rotation of said mixer structure for applying force to the material tending to move the material toward said discharging station, a plurality of paddles deployed about the axis of said helix substantially from said receiving station toward said discharging station and terminating at a part of said container intermediate said stations and being inclined in one direction and thereby being operable during rotation of said mixer structure for applying force to the material tending to move the material from said receiving station toward said discharging station in concert with said helix, and other paddles deployed about the axis of said helix from said intermediate part of said container to said discharging station and being inclined oppositely to the inclination of said first named paddles and thereby being operable during rotation of said structure for applying force to said material tending to move the material toward said receiving station in opposition to the forcing of said material by said helix and said first named paddles; means for introducing one of said liquids to said container adjacent said receiving station; and means for introducing the other of said liquids to said container substantially at said intermediate part of said container.

9. In an apparatus for mixing two different liquids with particulate solid material, a container having a solid material receiving station and a mixture discharging station; means for introducing solid material to said container at said receiving station; a mixer structure mounted for rotation in said container about an axis extending from said receiving station to said discharging station and comprising first means extending substantially from said receiving station to said discharging station and being operable during rotation of said mixer structure for applying force to the material tending to move the material toward said discharging station, second means extending substantially from said receiving station toward said discharging station and terminating at a part of said container intermediate said stations approximately one-third the distance from said receiving station to said discharging station, said second means being operable during rotation of said mixer structure for applying force to the material tending to move the material from said receiving station toward said discharging station in concert with said first means, and third means extending from said intermediate part of said container to said discharging station and being operable during rotation of said structure for applying force to said material tending to move the material toward said receiving station in opposition to the forcing of said material by said first and second means; means for introducing one of said liquids to said container adjacent said receiving station; and means for introducing the other of said liquids to said container substantially at said intermediate part of said container.

10. In an apparatus for mixing two different liquids with particulate solid material, a container having a solid material receiving station and a mixture discharging station; means for introducing solid material to said container at said receiving station; a mixer structure mounted for rotation in said container about an axis extending from said receiving station to said discharging station and comprising a central shaft, material mixing and feeding means mounted on said shaft and including a first set of blades within a first zone adjacent said receiving station and terminating at a part of said shaft intermediate said receiving station and said discharging station, the blades of said first set respectively being inclined about their own axes at an angle with reference to their planes of rotation whereby to tend to force material toward said discharging station, and material mixing and feed opposing means including a second set of blades within a second zone extending from said intermediate part of said shaft to said discharging station and being inclined about their own axes oppositely to the inclination of said first set whereby to tend to force material toward said receiving station in opposition to the forcing of material by said material mixing and feeding means, the latter exerting a greater force on the material than said material mixing and feed opposing means whereby said material will be fed from said receiving station to said discharging station; means for introducing one of said liquids to said container adjacent said receiving station; and means for introducing the other of said liquids to said container substantially at said intermediate part of said container.

11. In an apparatus for mixing two different liquids with particulate solid material, a container having a solid material receiving station and a mixture discharging station; means for introducing solid material to said container at said receiving station; a mixer structure mounted for rotation in said container about an axis extending from said receiving station to said discharging station and comprising a central shaft, a plurality of blades mounted on and extending outwardly from said shaft in helical deployment therealong, a first set of said blades being within a first zone adjacent said receiving station and terminating at a part of said shaft intermediate said receiving station and said discharging station, the blades of said first set respectively being inclined about their own axes at an angle with reference to their planes of rotation whereby to tend to force material toward said discharging station, a second set of said blades being within a second zone extending from said intermediate part of said shaft to said discharging station and being inclined about their own axes oppositely to the inclination of said first set whereby to tend to force material toward said receiving station in opposition to the forcing of material by the blades of said first set, and a helix surrounding said shaft, following the helical deployment of said blades and being mounted on the outer ends of said blades, said helix acting in concert with said first set of blades for forcing material from said receiving station toward said discharging station in opposition to the forcing of material toward said receiving station by said second set of blades; means for introducing one of said liquids to said container adjacent said receiving station; and means for introducing the other of said liquids to said container substantially at said intermediate part of said container.

12. In an apparatus for mixing two different liquids with particulate solid material, a container having a solid material receiving station and a mixture discharging station; means for introducing solid material to said container at said reeciving station; a mixer structure mounted for rotation in said container about an axis extending from said receiving station to said discharging station and comprising a central shaft, a plurality of blades mounted on and extending outwardly from said shaft in helical deployment therealong, a first set of said blades being within a first zone adjacent said receiving station and terminating at a part of said shaft intermediate said receiving station and said discharging station approximately one-third the distance from said receiving station to said discharging station, the blades of said first set respectively being inclined about their own axes at an angle with reference to their planes of rotation whereby to tend to force material toward said discharging station, a second set of said blades being within a second zone extending from said intermediate part of said shaft to said discharging station and being inclined about their own axes oppositely to the inclination of said first set whereby to tend to force material toward said receiving station in opposition to the forcing of material by the blades of said first set, and a helix surrounding said shaft, following the helical deployment of said blades and being mounted on the outer ends of said blades, said helix acting in concert with said first set of blades for forcing material from said receiving station toward said discharging station in opposition to the forcing of material toward said receiving station by said second set of blades; means for introducing one of said liquids to said container adjacent said receiving station; and means for introducing the other of said liquids to said container substantially at said intermediate part of said container.

13. In a mixing apparatus, a substantially horizontal container having horizontally spaced material receiving and discharging stations and an end wall at said discharging station; mixing means for forwarding material from said receiving station to said discharging station and mixing the material during forwarding; an opening in said end wall extending upwardly from a level substantially at the bottom of said container; and a closure member mounted for movement over said opening to different positions in which the top of said closure member is disposed at different levels below the top of said opening with said closure member covering said opening from the top of said closure member down to the bottom of said opening, whereby to provide an effective material discharging opening of selected area and at a selected height above the bottom of said container.

14. In a mixing apparatus, a substantially horizontal container having horizontally spaced material receiving and mixture discharging stations, an end wall at said discharging station and an opening in said end wall extending upwardly from a level substantially at the bottom of the container; a mixer structure mounted for rotation in said container about a horizontal axis extending from said receiving station to said discharging station and comprising first means extending substantially from said receiving station to said discharging station and being operable during rotation of said mixer structure for applying force to the material tending to move the material toward said discharging station, second means extending substantially from said receiving station toward said discharging station and terminating at a part of said container intermediate said stations and also being operable during rotation of said mixer structure for applying force to the material tending to move the material from said receiving station toward said discharging station in concert with said first means, and third means extending from said intermediate part of said container to said discharging station and being operable during rotation of said structure for applying force to said material tending to move the material toward said receiving station in opposition to the forcing of said material by said first and second means; and a closure member mounted for movement over said opening to different positions in which the top of said closure member is disposed at different levels below the top of said opening with said closure member covering said opening from the top of said closure member down to the bottom of said opening, whereby to provide an effective material discharge opening of selected area and at a selected height above the bottom of said container.

15. In a mixing apparatus, a substantially horizontal container having horizontally spaced material receiving and discharging stations and an end wall at said discharging station; mixing means for forwarding material from said receiving station to said discharging station and mixing the material during forwarding; an opening in said end wall extending upwardly from a level substantially at the bottom of said container; a closure member of a width and a height at least as great as the width and height of said opening; and means mounting said closure member for downward movements from a closed position in which said closure member covers said opening to different lower levels for providing a selected effective discharge opening of controlled size and elevation above the top of said closure member, and for movement upwardly from said closed position for providing a container emptying opening below the bottom of said closure member.

16. In a mixing apparatus, a substantially horizontal container having horizontally spaced material receiving and mixture discharging stations, an end wall at said discharging station and an opening in said end wall extending upwardly from a level substantially at the bottom of the container; a mixer structure mounted for rotation in said container about an axis extending from said receiving station to said discharging station and comprising a central shaft, material mixing and feeding means mounted on said shaft and including a first set of blades within a first zone adjacent said receiving station and terminating at a part of said shaft intermediate said receiving station and said discharging station, the blades of said first set respectively being inclined about their own axes at an angle with reference to their planes of rotation whereby to tend to force material toward said discharging station, and material mixing and feed opposing means including a second set of blades within a second zone extending from said intermediate part of said shaft to said discharging station and being inclined about their own axes oppositely to the inclination of said first set whereby to tend to force material toward said receiving station in opposition to the forcing of material by said material mixing and feeding means, the latter exerting a greater force on the material than said material mixing and feed opposing means whereby said material will be fed from said receiving station to said discharging station; and a closure member mounted for movement over said opening to different positions in which the top of said closure member is disposed at different levels below the top of said opening with said closure member covering said opening from the top of said closure member down to the bottom of said opening, whereby to provide an effective material discharge opening of selected area and at a selected height above the bottom of said container.

17. In a mixing apparatus, a substantially horizontal container having horizontally spaced material receiving and mixture discharging stations, an end wall at said discharging station and an opening in said end wall extending upwardly from a level substantially at the bottom of the container; a mixer structure mounted for rotation in said container about a horizontal axis extending from said receiving station to said discharging station and comprising a helix extending substantially from said receiving station to said discharging station and being operable during rotation of said mixer structure for applying force to the material tending to move the material toward said discharging station, first paddle means extending substantially from said receiving station toward said discharging station and terminating at a part of said container intermediate said stations and also being operable during rotation of said mixer structure for applying force to the material tending to move the material from said receiving station toward said discharging station in concert with said helix, and second paddle means extending from said intermediate part of said container to said discharging station and being operable during rotation of said structure for applying force to said material tending to move the material toward said receiving station in opposition to the forcing of said material by said helix and said first paddle means; and a closure member mounted for movement over said opening to different positions in which the top of said closure member is disposed at different levels below the top of said opening with said closure member covering said opening from the top of said closure member down to the bottom of said opening, whereby to provide an effective material discharge opening of selected area and at a selected height above the bottom of said container, said closure member being movable upwardly to a position in which it uncovers the bottom portion of said opening instead of the top portion thereof for permitting material to be flushed substantially completely from said container.

References Cited in the file of this patent

UNITED STATES PATENTS

| | | |
|---|---|---|
| 336,164 | Schillinger | Feb. 16, 1886 |
| 918,394 | Thomas | Apr. 13, 1909 |
| 934,603 | Gedge | Sept. 21, 1909 |
| 1,304,619 | Stamp | May 27, 1919 |
| 1,495,510 | Escher | May 27, 1924 |
| 1,941,808 | McConnaughay | Jan. 2, 1934 |
| 1,949,876 | Plauson | Mar. 6, 1934 |
| 1,987,243 | Madsen | Jan. 8, 1935 |
| 2,031,326 | Miller | Feb. 18, 1936 |
| 2,068,164 | Caldwell | Jan. 19, 1937 |
| 2,209,710 | Wood | July 30, 1940 |
| 2,525,573 | Zicovich | Oct. 10, 1950 |
| 2,698,742 | McCoy | Jan. 4, 1955 |
| 2,876,686 | Birney | Mar. 10, 1959 |
| 2,907,555 | Engels | Oct. 6, 1959 |
| 2,948,519 | Bradshaw | Aug. 9, 1960 |